United States Patent
Liu et al.

(10) Patent No.: US 10,932,264 B2
(45) Date of Patent: Feb. 23, 2021

(54) METHOD AND SYSTEM FOR ADJUSTING COMMUNICATION CHANNEL BASED ON SIGNAL SCAN RESULT

(71) Applicant: KIWI TECHNOLOGY INC., Hsinchu County (TW)

(72) Inventors: Jian-Hong Liu, Hsinchu County (TW); Kuo-Chung Gan, Hsinchu County (TW)

(73) Assignee: KIWI TECHNOLOGY INC., Hsinchu County (TW)

(*) Notice: Subject to any disclaimer, the term of this patent is extended or adjusted under 35 U.S.C. 154(b) by 262 days.

(21) Appl. No.: 16/180,579

(22) Filed: Nov. 5, 2018

(65) Prior Publication Data

US 2019/0335460 A1   Oct. 31, 2019

(30) Foreign Application Priority Data

Apr. 27, 2018 (TW) .................................. 107114555

(51) Int. Cl.
*H04W 72/04* (2009.01)
*H04W 74/08* (2009.01)
*H04W 88/16* (2009.01)

(52) U.S. Cl.
CPC ... *H04W 72/0453* (2013.01); *H04W 74/0808* (2013.01); *H04W 88/16* (2013.01)

(58) Field of Classification Search
CPC ....... H04L 5/14; H04L 5/1446; H04L 5/1438; H04W 72/12; H04W 74/0808;
(Continued)

(56) References Cited

U.S. PATENT DOCUMENTS

2005/0197131 A1* 9/2005 Ikegami ............... H04W 16/10
455/450
2010/0153374 A1   6/2010 LeBlond et al.
(Continued)

FOREIGN PATENT DOCUMENTS

JP   2010245725 A   10/2010
JP   2014204424 A   10/2014
(Continued)

OTHER PUBLICATIONS

"A study on gateway placement method considering power efficiency for IoT platform using LPWA communication"; SIG Technical reports, Nov. 8, 2017.
(Continued)

*Primary Examiner* — Will W Lin
(74) *Attorney, Agent, or Firm* — Li & Cai Intellectual Property (USA) Office

(57) ABSTRACT

The disclosure is related to a method and a system for adjusting a communication channel based on a signal scan result. The system includes wireless gateway modules, a wireless transceiver module and a control circuit. The control circuit determines whether or not the wireless transceiver module conducts any transmission task. The wireless transceiver module is activated to scan signals over a selected frequency when it is available. Multiple scan results can be obtained when the scanning process is repeatedly conducted in different frequencies. Signal information is recorded in a signal scan table. Thus, if the system determines the frequency needs to be adjusted based on a transmission status, one of the frequencies recorded in the table can be chosen and set for the wireless gateway module and a transmission frequency for a terminal node is modified.

13 Claims, 6 Drawing Sheets

(58) Field of Classification Search
CPC ... H04W 88/16; H04W 88/14; H04W 84/047; H04W 28/16; H04W 72/0446
See application file for complete search history.

(56) References Cited

U.S. PATENT DOCUMENTS

| | | |
|---|---|---|
| 2012/0275361 A1 | 11/2012 | Berenberg et al. |
| 2012/0294168 A1* | 11/2012 | Freda .................. H04W 24/10 370/252 |
| 2013/0155883 A1* | 6/2013 | Bhattacharjee ....... H04W 48/16 370/252 |
| 2015/0294431 A1* | 10/2015 | Fiorucci ................ G07B 15/02 705/13 |
| 2016/0262071 A1 | 9/2016 | Gu |
| 2017/0230961 A1 | 8/2017 | Park et al. |
| 2017/0311181 A1* | 10/2017 | Furuichi ............... H04W 16/02 |
| 2018/0024828 A1 | 1/2018 | Nogueira-Nine |
| 2018/0279213 A1* | 9/2018 | Raghavan ............ H04B 7/0421 |
| 2019/0141620 A1* | 5/2019 | Pujari .................. H04W 48/16 |
| 2019/0182816 A1* | 6/2019 | Choe .................... H04W 24/08 |
| 2019/0246340 A1* | 8/2019 | Jung .................... H04W 24/10 |
| 2019/0356408 A1* | 11/2019 | Sharp ................... H04K 3/226 |

FOREIGN PATENT DOCUMENTS

| | | |
|---|---|---|
| KR | 101742443 B1 | 5/2017 |
| WO | 2016117215 A1 | 7/2016 |

OTHER PUBLICATIONS

Susumu Mstsui, "Construction of a wireless multi-hop network using LoRa"; IEICE Technical Report, The Institute of Electronics, Information and Communication Engineers, http://www.ieice.org/; Nov. 11, 2017.

Yuri Fujisaki, et al., "Investigation of Radio Interference among Heterogeneous Wireless Communication Technologies on 920 MHz Frequency Band Radio Interference between Wi-Sun and LoRaWan"; IEICE Technical Report, The Institute of Electronics, Information and Communication Engineers, http://www.ieice.org/, Mar. 2, 2018.

* cited by examiner

METHOD AND SYSTEM FOR ADJUSTING COMMUNICATION CHANNEL BASED ON SIGNAL SCAN RESULT

CROSS-REFERENCE TO RELATED PATENT APPLICATION

This application claims the benefit of priority to Taiwan Patent Application No. 107114555, filed on Apr. 27, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure relates to a communication method and system, and in particular to a LoRa communication method and system with channel adjustment function based on a signal scan result.

BACKGROUND OF THE DISCLOSURE

A conventional wireless communication technology performs data transmission through a gateway, and in particular between two network domains. The conventional circuit design of the wireless gateway is to dispose a gateway circuit for processing packets received from the terminals, a controller for operating the gateway and a transceiver for delivering signals into a wireless gateway. In a network system, multiple wireless gateways may be disposed to process more data generated by the terminals.

Reference is made to FIG. 1. In a specific wireless network system, a framework of the system shows a plurality of wireless gateways 101, 102 and 103 that can be long range (LoRa) concentrators. This kind of long-distance and low-power-consumption communication technology is applicable to Internet of Things (IoT). The LoRa concentrator is capable of bi-directional communication for linking with the terminals A, B, C, D and E. The terminals A, B, C, D and E can be the various sensors and electronic devices of IoT. The wireless gateways 101, 102 and 103 process the signals transmitted by the terminals A, B, C, D and E. The terminals A, B, C, D and E can be respectively connected with the same or different wireless gateways 101, 102 and 103 by a specific communication protocol such as WiFi™, Bluetooth™, or Zigbee. The wireless gateways 101, 102 and 103 can transmit the signals to back-end devices 111, 112 and 113 via a network server 110.

For example, the terminals A, B, C, D and E are such as environmental sensors disposed in a plant. The sensors can be a smoke detector, a thermometer, a hygrometer, a light sensor, a power sensor, a video monitor, and/or various electronic nodes. For receiving the signals generated by the terminals A, B, C, D and E, the wireless gateways 101, 102 and 103 should be placed at major locations in a certain place. A network server 111 is also provided for collecting the signals from the gateways 101, 102 and 103 for the back-end applications. The back-end devices 111, 112 and 113 may form an IoT ecosystem that provides the functionalities such as power monitoring, plant temperature and humidity monitoring, personnel movement monitoring, and equipment monitoring.

However, since the communication system adapted to the IoT application is required to provide instantaneous and accurate information, signal latency or packet loss should not be allowed.

SUMMARY OF THE DISCLOSURE

The disclosure is related to a communication method and a system that are able to adjust channel according to a signal scan result. The system can utilize an available communication element to scan the space for establishing a record of signal strengths while in an idle state. The record can be transmitted to a backhaul network server. When necessary, the transmission channel can be immediately adjusted according to the record so as to achieve an effect of adaptive frequency hopping.

In one embodiment, the communication method performs channel adjustment according to a signal scan result. The method is adapted to a communication system including one or more wireless gateway modules that are able to connect with one or more terminal nodes through a multi-channel technology for receiving the signals from each of the terminal nodes. The communication system also includes a wireless transceiver module used to transmit the signals, and a control circuit connected with the wireless gateway modules and the wireless transceiver module via a connection circuit.

In the communication method that performs channel adjustment in response to the scan result, the control circuit firstly determines if the wireless transceiver module performs an instruction of signal transmission. When the control circuit determines that the wireless transceiver module is performing the transmission instruction, the wireless transceiver module does not perform tasks of frequency selection and signal scan but performs the transmission first. When the wireless transceiver module does not perform any transmission instruction, the control circuit selects a frequency and drives the wireless transceiver module to scan a space with the selected frequency so as to produce a scan result. The control circuit repeatedly drives the wireless transceiver module to scan the space with different frequencies for producing a plurality of scan results, and recording the signal information therein to a signal scan table.

Further, the communication system determines the transmission frequency via the control circuit according to a transmission status. For example, when there is a high packet loss rate, a signal scan table can be retrieved from the system or a backhaul network server via a network, one of the frequencies in the signal scan table is selected to be set as a transmission frequency of the wireless gateway module and frequency information of one or more terminal nodes is further modified.

The abovementioned backhaul network server connects with a plurality of communication systems via the network. A database of the server records the signal scan table generated by each of the communication systems.

According to one of the embodiments, the wireless gateway module can be an LoRa concentrator. The wireless transceiver module can be an LBT module that supports an LoRa communication. In the communication system, the LBT module processes the signals received by the LoRa concentrator through the control circuit. The LoRa concentrator in the communication system is configured to be a one-way receiver cooperating with the LBT module that is configured to be a one-way transmitter.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
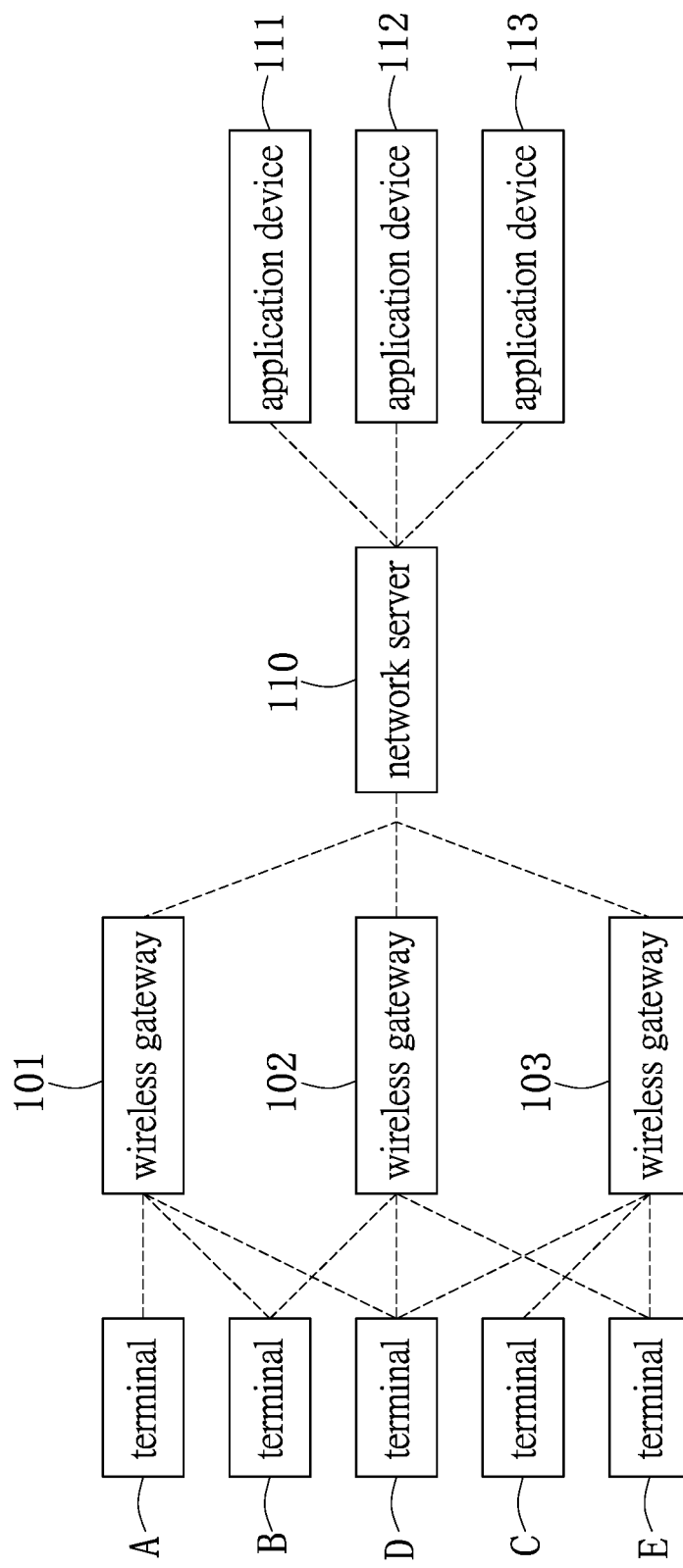
FIG. 1 shows a schematic diagram of a system framework of a conventional network system used to process signals from terminals.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a method for adjusting communication channel based on a signal scan result, and a system thereof. The method implements an adaptive frequency hopping in the communication system. The technical means thereof allows a communication circuit to scan a space when the communication circuit is in an idle state or not performing any transmission task. The communication circuit then records signal information based on a signal scan result. Therefore the system can provide a good communication quality by adjusting its operating frequency according to the signal scan result if necessary.

In one embodiment, the communication method can be applied to an environment embodying the communication system in compliance with an LoRa communication protocol. The communication system is generally used for IoT since it features low power consumption and long distance transmission In one embodiment of the communication system, the communication circuit is divided into a receiver and a transmitter for supporting multi-channel two-way communication and for better scalability. The main elements of the communication system include one or more wireless gateway modules, at least one wireless transceiver module and a control circuit. The control circuit includes a processor, a memory and the communication circuit. The wireless gateway module can connect with the various terminal nodes via a multi-channel technology. The terminal node is such as an IoT device. In the method, the wireless gateway module receives signals from the terminal node, and the control circuit processes the signals. The wireless transceiver module then transmits the signals after deciding a transmission channel.

Figure 2:
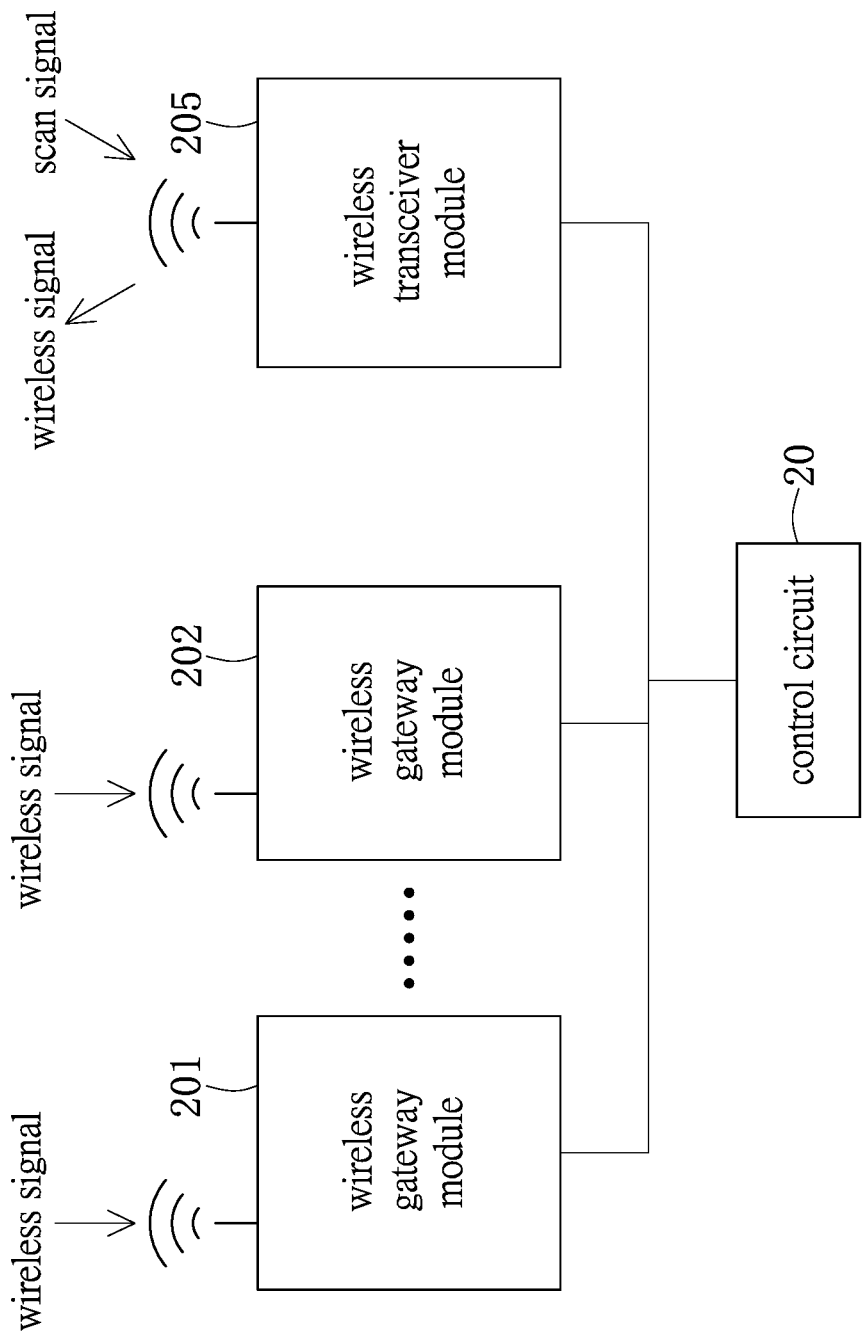
FIG. 2 shows a schematic diagram of a framework of a communication system according to one embodiment of the disclosure.
Figure 4:
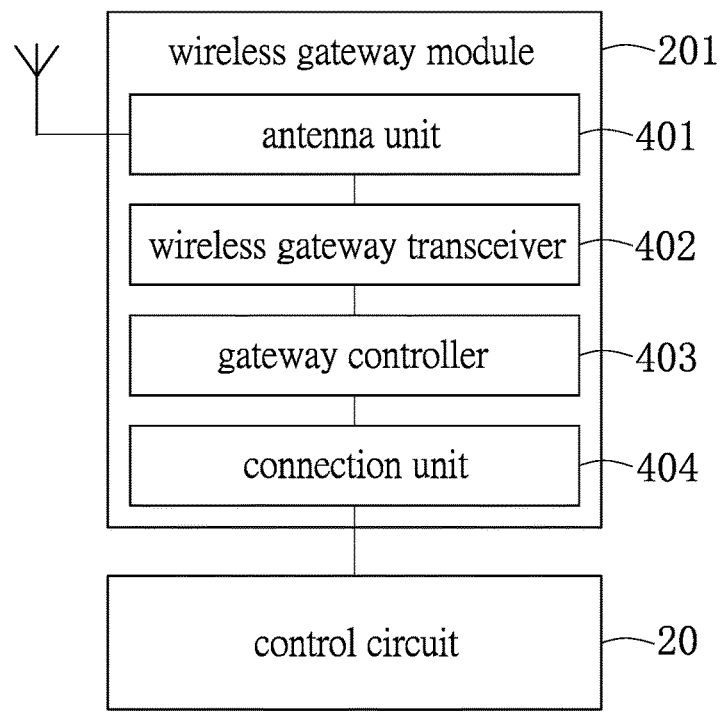
FIG. 4 shows a circuit block diagram of a wireless gateway module of a communication system according to one embodiment of the disclosure.

Reference is made to FIG. 2 that depicts a system framework of a communication system according to one embodiment of the disclosure. The main elements of the communication system include one or more wireless gateway modules 201 and 202, at least one wireless transceiver module 205 and a control circuit 20. The two wireless gateway modules 201 and 202 and one wireless transceiver module 205 are exemplarily described. In practice, one wireless transceiver module 205 processes signals transmitted to the terminal nodes from multiple wireless gateway modules 201 and 202. However, the number does not limit the preset disclosure and multiple wireless transceiver modules 205 may be adapted as needed. The main circuits of the wireless gateway module 201 or 202 are a gateway controller and a wireless gateway transceiver as shown in FIG. 4. The wireless gateway module 201 and 202 support a multi-channel communication technology that is used to communicate with various terminal nodes. The communication system utilizes multiple one-way channels to receive signals without influence when a data processing circuit commonly used by both receiving and transmitting processes in the two-way communication system. The wireless transceiver module 205 is dedicated to transmit the signals in the present example.

The wireless gateway modules 201 and 202 are connected with the terminal nodes, which can be sensors, electrical devices, or home appliances. The wireless gateway module 201 and 202 can be an LoRa concentrator which utilizes, but not limited to, a specific communication protocol to communicate with the terminal nodes. The communication protocol is implemented by a wireless communication technology such as WiFi™, Bluetooth™, or a low-power wide area network (LPWAN).

Figure 5:
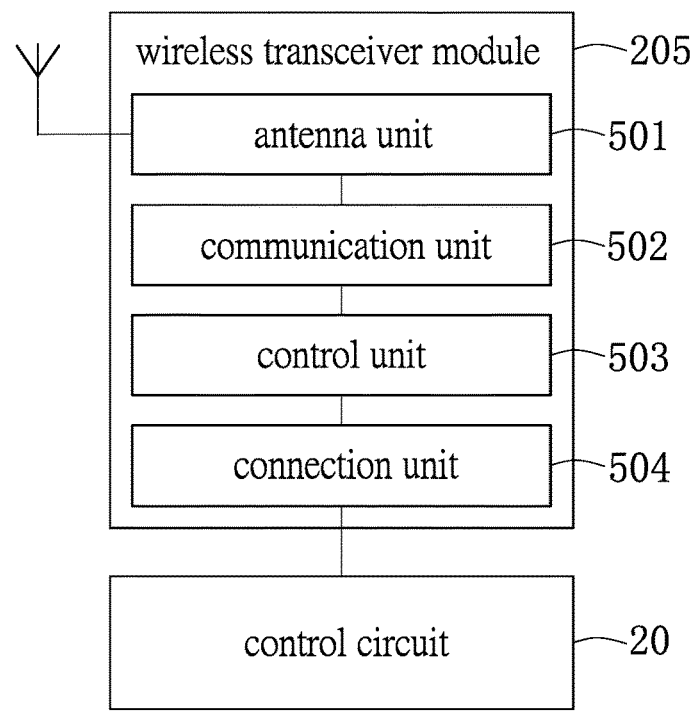
FIG. 5 shows a circuit block diagram of a wireless transceiver module of a communication system according to one embodiment of the disclosure.

The wireless transceiver module 205 connected with the one or more wireless gateway modules 201 and 202 conducts data transmission via its internal circuits, as shown in FIG. 5. The wireless transceiver module 205 receives a transmission instruction from the control circuit 20. The transmission instruction includes a transmission request and signals. The wireless transceiver module 205 then decides a transmission channel for transmitting signals via a transceiver and an antenna.

In one embodiment, the wireless transceiver module 205 can be a Listen Before Talk (LBT) module that supports a LoRa communication technology. During operation, the LBT module is required to wait for the control circuit 20 of the system to transmit a transmission instruction. When receiving the transmission instruction and analyzing the information such as a timestamp and a transmission channel from the instruction, the LBT module transmits the signals via a dedicated channel designated by the control circuit 20. The signals can be the acknowledge signals (ACK) used to respond to the terminal node. The LBT mechanism firstly senses if the channel is available by a clear channel assessment (CCA) process, and then adjusts the transmission time within a specific period of time, e.g. one to ten milliseconds. Therefore, the LBT mechanism adopted by the communication system allows the system to sense the channel and determine if the channel is free or non-free for data transmission beforehand via the Listen Before Talk function. The LBT module can be timely activated to trigger the function of data transmission.

Still further, in order to expand the signal coverage and application of the wireless communication system, a sufficient number of wireless gateway modules are required to get larger coverage thereof. The application is such as IoT that requires processing a large number of sensor data. The communication system with separated receiving and transmitting modules expands its signal coverage by adding the wireless gateway modules. Alternatively, the system can also add the wireless transceiver module to process the data generated by the multiple channels of the wireless gateway module.

The control circuit 20 acts as a main control circuit for the entire communication system and can be implemented by a circuit module, an IC (Integrated Circuit), or an integration of hardware and software. The control circuit 20 is connected with the one or more wireless gateway modules 201 and 202 and the at least one wireless transceiver module 205 via a bus, or other wired or wireless connection circuit. After receiving signals from one of the wireless gateway modules 201 or 202, the control circuit 20 determines a transmission time, and instructs the wireless transceiver module 205 to transmit the signals.

Figure 3:
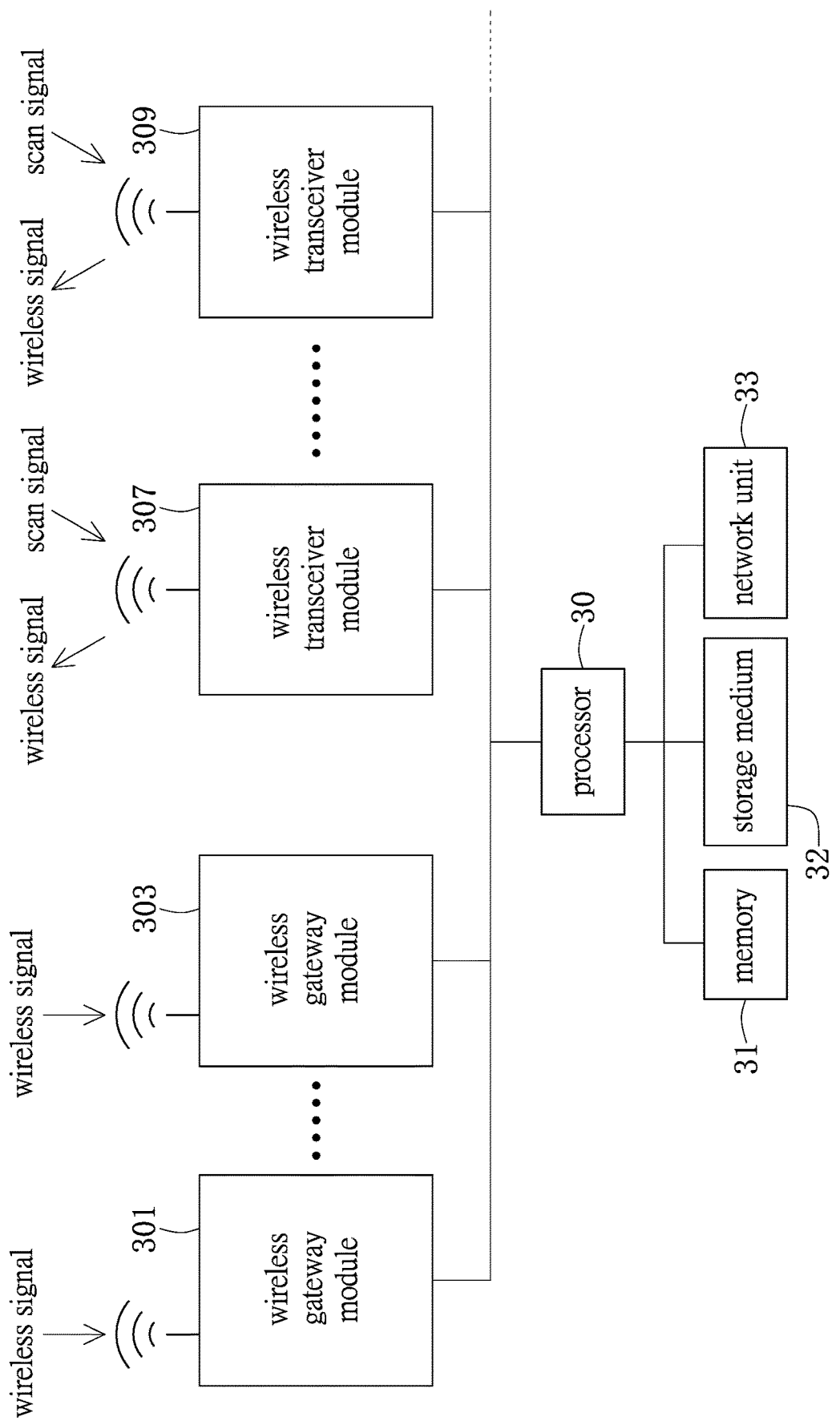
FIG. 3 shows a schematic diagram of a framework of a communication system in another embodiment of the disclosure.

FIG. 3 shows a schematic diagram of a framework of the communication system that performs the communication method for channel adjustment according to one embodiment of the disclosure. The system includes a plurality of wireless gateway modules 301 and 303 used to receive signals from the various terminal nodes. The signals from the terminal nodes are such as the signals generated by the sensors, the communication data collected from the electronic devices, or the operating signals generated by the home appliances. Further, the wireless gateway modules 301 and 303 can act as the LoRa concentrators that are communicated with the terminal nodes via WiFi™ Bluetooth™, or the LPWAN.

The communication system includes at least one wireless transceiver module, e.g. the wireless transceiver modules 307 and 309 of the present example, and each of the modules can process the signals received by any of the wireless gateway modules 301 and 303. Since the communication system utilizes the one-way multiple channels to receive signals, the communication system would not be affected by the other channels, e.g. the two-way receiving and transmitting channels. Further, since the system is configured to be modularized, the system can be expanded by increasing the number of the wireless transceiver modules (307 and 309) to have great flexibility and scalability.

The control circuit can be configured to have a processor 30, a memory 31 and a storage medium 32. The control circuit also includes a network unit 33 for connecting with an external network. In addition to controlling the operations of the modules of the system, the processor 30 is able to process the signals being received and transmitted. The memory 31 acts as a system memory that is used to temporarily store the incoming and outgoing signals. The storage medium 32 records the requisite information used to operate the system, and also be used to store a signal scan table according to a scan result that is produced in the communication method for channel adjustment. The network unit 33 is provided for the system to connect with an external network, e.g. a LAN or the Internet, via a wired or wireless connection. The wireless connection can be WiFi™. The wired connection may be Ethernet.

According to one embodiment, the communication system shown in FIG. 2 or FIG. 3 is such as a gateway device that is used to serve the IoT terminals in an LAN. The gateway device supports LoRa communication protocol. The communication circuits of the gateway device are separated into two types of circuits that are responsible for receiving and transmitting signals respectively. A wireless gateway module of the gateway device is used to receive signals from the terminals. A wireless transceiver module is used to transmit the signals being processed to an external device.

FIG. 4 shows a schematic diagram of circuit blocks of the main components of the wireless gateway module of the system.

For example, in the wireless gateway module 201, an antenna unit 401, a wireless gateway transceiver 402, a gateway controller 403 and a connection unit 404 are included. The wireless gateway module 201 operates in a plurality of network segments, and connects with one or more terminal nodes via a multi-channel technology. The wireless gateway module 201 receives the signals from the terminal nodes via the antenna unit 401. The wireless gateway transceiver 402 integrates the receiving and transmitting functions originally in the wireless gateway module 201. The wireless gateway transceiver 402 processes RF (Radio Frequency) signals transmitted from the terminal node so as to retrieve the data and time stamp therein. The gateway controller 403 controls operations of the wireless gateway module 201. For example, the gateway controller 403 controls the time for the antenna unit 401 and the wireless gateway transceiver 402 to receive the signals, and transmits the signals to the control circuit 20 via the connection unit 404.

It is worth noting that, in the communication method for channel adjustment based on a signal scan result, the wireless gateway module 201 can adjust a transmission frequency in response to a practical transmission status. For example, when a packet loss rate is larger than a threshold or a data rate is lower than another threshold, a channel frequency having a better communication quality may be applied through the mechanism in the communication method for adjusting the frequency. The gateway controller 403 receives an instruction for adjusting channel issued by the control circuit 20 for setting up a receiving frequency. The frequency information of the terminal node can be modified under permissible access rights.

The selection of frequency is in response to a signal scan result that is obtained by the wireless transceiver module 205. Reference is made to FIG. 5 that shows a circuit block diagram of the wireless transceiver module of the communication system in one embodiment of the disclosure.

The main elements of the wireless transceiver module 205 include an antenna unit 501, a communication unit 502, a control unit 503 and a connection unit 504. The control unit 503 is a major circuit for operating the wireless transceiver module 205. The control unit 503 is electrically connected with the control circuit 20 via the connection unit 504, and receives instructions generated by the control circuit 20. In an exemplary example, when the wireless transceiver module 205 is idling or not performing any transmission instruction, the control circuit 20 instructs the wireless transceiver module 205 to scan a certain range of frequencies. The communication unit 502 then drives the antenna unit 501 to scan signals in the space within a specific range of frequencies, and the signal information with respect with a frequency can be obtained.

The communication unit 502 is a driving circuit of the antenna unit 501, performs a specific wireless communication protocol, and drives the antenna unit 501 to scan under a specific frequency so as to obtain signal information such as received signal strength indication (RSSI). After that, the signal information is then transmitted to the control circuit 20 via a bus or a connection that embodies the connection unit 504. The control circuit 20 records the scan result to be a signal scan table stored in a memory or transmitted to an external host via a network.

Figure 6:
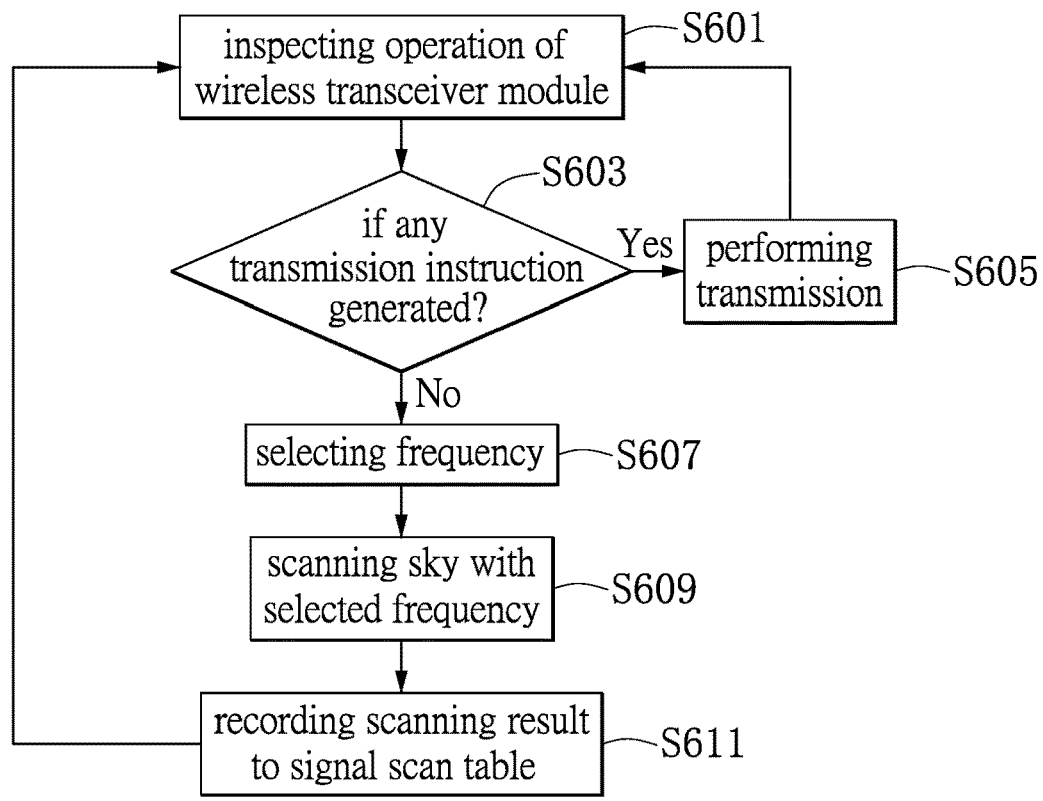
FIG. 6 shows a flow chart of creating a signal scan table in a communication method for channel adjustment based on a signal scan result according to one embodiment of the disclosure.

FIG. 6 shows a flow chart describing the communication method that produces the signal scan result according to one embodiment of the disclosure.

In the method, the control circuit of the communication system performs signal scan. The wireless gateway module and the wireless transceiver module are under the control of the control circuit. The control circuit is therefore able to obtain operating information of these communication circuits. While it is reiterated with different frequencies (step S601), the system inspects the wireless transceiver module for determining whether or not the wireless transceiver module is in an idle state (step S603). For example, the communication system inspects whether or not the wireless transceiver module is performing any transmission instruction or operating any transmission task.

When the control circuit determines that the wireless transceiver module is performing the transmission instruction ('yes' in FIG. 6), the wireless transceiver module does not perform tasks of frequency selection and signal scan but performing a transmission task first (step S605).

On the contrary, if the control circuit finds that the wireless transceiver module is in an idle state or not performing any transmission instruction ('no' in FIG. 6), it appears that the wireless transceiver module is available for conducting the signal scan (step S607). Meanwhile, the control circuit one-by-one selects one of the frequencies. The control circuit can provide the frequencies in sequence to the wireless transceiver module. In step S609, the control unit (503 of FIG. 5) of the wireless transceiver module controls the communication unit (502 of FIG. 5) to drive the antenna unit (501 of FIG. 5) so as to scan the space with a selected frequency, and a scan result is then generated. In step S611, the scan result is formed as a signal scan table.

When the wireless transceiver module is in an idle state and does not perform any transmission task, the wireless transceiver module can continue performing signal scan with different frequencies. A plurality of scan results can be generated accordingly. The signal information according to the scan results is recorded to or form a signal scan table. According to one embodiment, the signal scan table can be stored in a memory of the control circuit, or stored to an external host via a network. The external host may be a backhaul network server shown in FIG. 7.

Table 1 schematically shows a signal scan table that includes RSSIs corresponding to several frequencies, e.g. 920.2 MHz, 920.4 MHz, and so on. It should be noted that these RSSIs can be updated at any time and thus can be a reference for the communication system to adjust the operating frequency.

TABLE 1

| frequency | RSSI |
|---|---|
| 920.2 MHz | −92 |
| 920.4 MHz | −103 |
| 920.6 MHz | −89 |
| 920.8 MHz | −92 |
| 921.0 MHz | −95 |
| 921.2 MHz | −105 |
| . . . | . . . |

Figure 7:
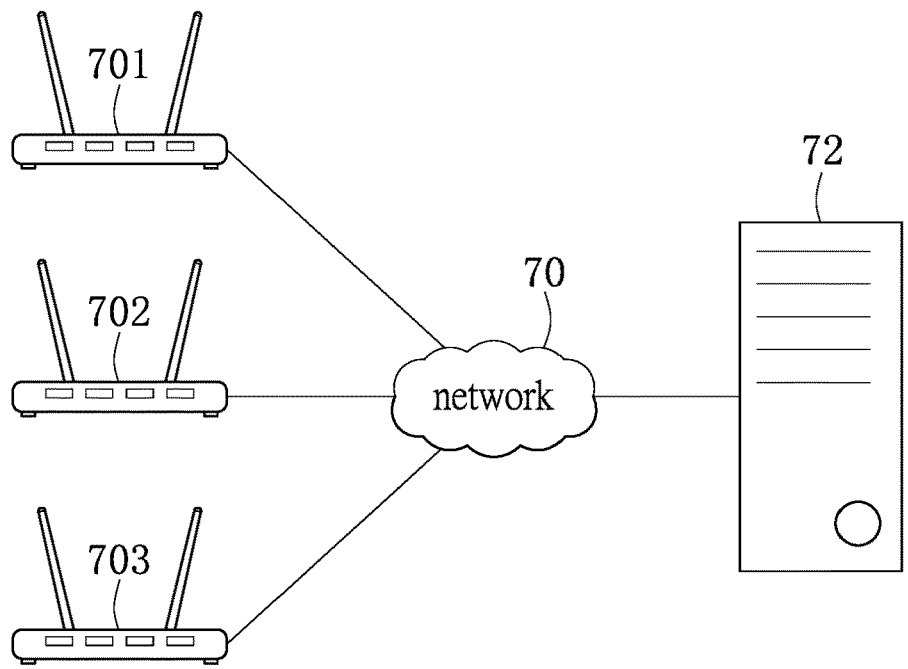
FIG. 7 shows a schematic diagram of an extensive example of the communication system in one embodiment of the disclosure.

FIG. 7 shows an extended schematic diagram describing the communication system according to one embodiment of the disclosure.

Communication systems 701, 702 and 703 are three-prong systems that embody three different IoT gateways in different LANs. The main circuits of each of the communication systems 701, 702 and 703 described in the above embodiments include one or more wireless gateway module, at least one wireless transceiver module and a control circuit are included in one communication system. In particular, the control circuit includes a processor, various types of memories and a network unit that is used to interface with a network 70. The network unit is exemplarily connected to a backhaul network server 72 via the network 70 in the present example.

The backhaul network acts as an intermediate node that is used transmit the local signal information to a backbone network (or a core network). In the communication method for channel adjustment, the signal scan table established by each of the communication systems 701, 702 and 703 can be transmitted to the backhaul network server 72 via the network 70. In other words, the backhaul network server 72 connects with the plurality of communication systems 701, 702 and 703 via the network 70 and then acquires signal scan tables from the communication systems 701, 702 and 703.

Figure 8:
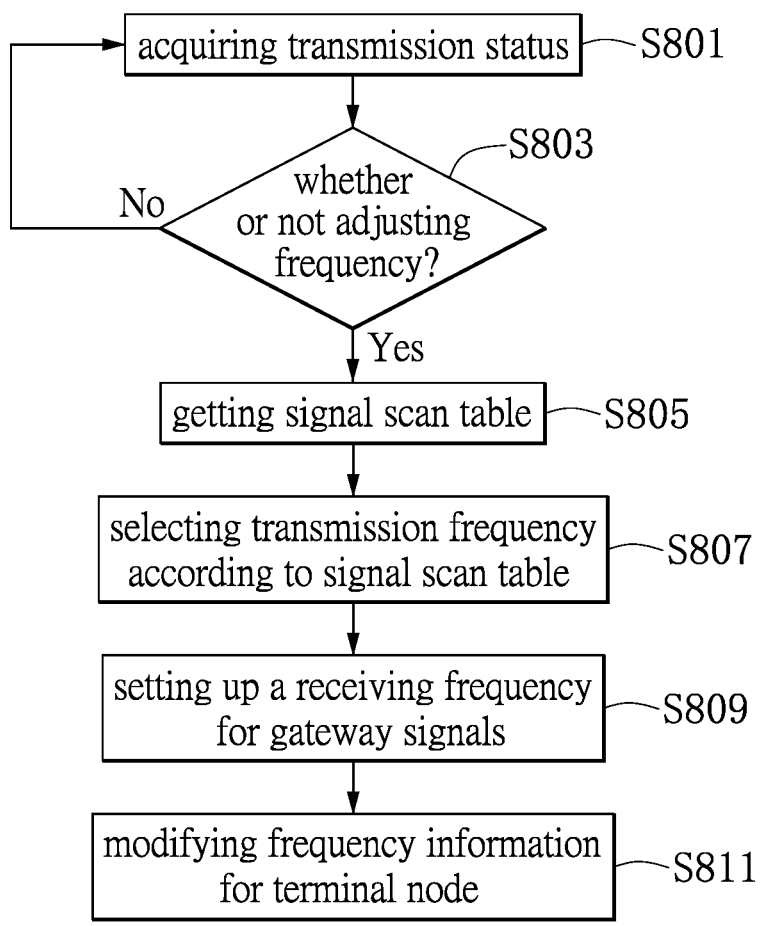
FIG. 8 shows a flow chart of a process for setting a transmission frequency in the communication method in one embodiment of the disclosure.

Reference is made to FIG. 8 which shows a flow chart describing setting a transmission frequency in the communication method in one embodiment of the disclosure. The control circuit of the communication system continuously obtains a transmission status of each of the communication circuits of the system. The transmission status is such as the transmission status of the wireless gateway module that connects with the IoT terminal devices. In step S801, the control circuit monitors the transmission status including a packet loss rate and a packet transmission rate of the wireless gateway module. In step S803, the control circuit determines whether or not the system needs to adjust the frequency.

For example, the control circuit continuously monitors the transmission status such as the packet loss rate and packet transmission rate based on a preset threshold. The control circuit determines whether or not the transmission status is below a requirement of system. If the transmission status is not below the requirement, step S801 and the follow-up steps are repeated. If the transmission status is below the requirement of the system, the operating frequency of the system needs to be adjusted, and then step S805 is executed. In the meantime, the signal scan table can be obtained from the memory of the control circuit or the backhaul network server. In step S807, the communication system decides that the transmission frequency is required to be adjusted based on the transmission status, and the signal scan table is then introduced. It is necessary for the communication system to adjust a transmission frequency by the control circuit in response to a transmission status, one of the frequencies recorded in the signal scan table is selected to be the transmission frequency for one of the wireless gateway modules. In step S809, a transmission frequency is set according to the selected frequency. One of the objectives of the wireless gateway module is to receive signals generated by the terminals, and the selected frequency will be a receiving frequency. If necessary, such as in step S811, the system can actively modify frequency information with respect to the terminal nodes for effectively transmitting signals using the wireless gateway module.

According to the above embodiments of the disclosure, the communication method and the system for channel adjustment utilizes the idle communication element to scan signals of frequencies so as to record the RSSIs. The RSSIs may be transmitted to the backhaul server. The system can adjust the operating frequency according to the records. So that an adaptive frequency hopping can be accomplished.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A communication method for adjusting a channel based on a signal scan result, adapted to a communication system including one or more wireless gateway modules that receive signals from terminal nodes through a multi-channel technology, a wireless transceiver module used to transmit signals, and a control circuit that connects with the one or more wireless gateway modules and the wireless transceiver module via a connection circuit, wherein the communication method comprises:

selecting a frequency by the control circuit when the wireless transceiver module does not perform any transmission instruction and driving the wireless transceiver module to scan a space with the selected frequency so as to produce a scan result; and repeatedly selecting other frequencies to scan the space for producing a plurality of scan results, and recording signal information therein to a signal scan table;

wherein, the wireless gateway module is an LoRa concentrator and the wireless transceiver module is an LBT module supporting LoRa communication; in the communication system, the LBT module processes signals received by the one or more LoRa concentrators through the control circuit the LoRa concentrator in the communication system is configured to be a one-way receiver that is cooperated with the LBT module that is configured to be a one-way transmitter; when the communication system uses the control circuit to determine that a transmission frequency is required to be adjusted according to a transmission status, one of the frequencies recorded in the signal scan table is selected to be the transmission frequency for one of the wireless gateway modules.

2. The method as recited in claim 1, wherein, when the control circuit determines that the wireless transceiver module is performing the transmission instruction, the wireless transceiver module does not perform tasks of frequency selection and signal scan but performs the transmission instruction.

3. The method as recited in claim 1, wherein the signal scan table is stored in a memory of the control circuit or in a backhaul network server via a network.

4. The method as recited in claim 1, wherein the communication system determines whether or not the transmission frequency needs to be adjusted according to one or both of a packet loss rate and a packet transmission rate of the wireless gateway module.

5. The method as recited in claim 4, wherein, when the control circuit determines that the wireless transceiver module is performing the transmission instruction, the wireless transceiver module does not perform tasks of frequency selection and signal scan but performs the transmission instruction.

6. The method as recited in claim 1, wherein, when the transmission frequency of the wireless gateway module is set, frequency information of the one or more terminal nodes is modified.

7. The method as recited in claim 6, wherein, when the control circuit determines that the wireless transceiver module is performing the transmission instruction, the wireless transceiver module does not perform tasks of frequency selection and signal scan but performs the transmission instruction.

8. A communication system, comprising:

one or more wireless gateway modules, connected with one or more terminal nodes by a multi-channel technology to receive signals from the one or more terminal nodes;

a wireless transceiver module used to transmit signals; and a control circuit connected with the one or more wireless gateway modules and the wireless transceiver module via a connection circuit and performing a communication method for channel adjustment based on a signal scan result, wherein the communication method includes:

selecting a frequency by the control circuit when the wireless transceiver module does not perform any transmission instruction and driving the wireless transceiver module to scan a space with the selected frequency so as to produce a scan result; and repeated selecting other frequencies to scan the space for producing a plurality of scan results, and recording the signal information therein to a signal scan table;

wherein, the wireless gateway module is an LoRa concentrator and the wireless transceiver module is an LBT module supporting LoRa communication; in the communication system, the LBT module processes signals received by the one or more LoRa concentrators through the control circuit the LoRa concentrator in the communication system is configured to be a one-way receiver that is cooperated with the LBT module that is configured to be a one-way transmitter; when the communication system uses the control circuit to adjust a transmission frequency according to a transmission status, one of the frequencies recorded in the signal scan table is selected to be the transmission frequency for one of the wireless gateway modules, and frequency information of the one or more terminal nodes is modified.

9. The system as recited in claim 8, wherein, when the control circuit determines that the wireless transceiver module is performing the transmission instruction, the wireless transceiver module does not perform tasks of frequency selection and signal scan but performs the transmission instruction.

10. The system as recited in claim 8, wherein the communication system determines whether or not the transmission frequency needs to be adjusted according to one or both of a packet loss rate and a packet transmission rate of the wireless gateway module.

11. The system as recited in claim 8, wherein the communication system is connected with a backhaul network server via a network, and the signal scan table is stored in the backhaul network server via the network.

12. The system as recited in claim 11, wherein the backhaul network server is connected with a plurality of communication systems via the network and records the signal scan table of each of the communication systems.

13. The system as recited in claim 12, wherein, when the control circuit determines that the wireless transceiver module is performing the transmission instruction, the wireless transceiver module does not perform tasks of frequency selection and signal scan but performs the transmission instruction.

* * * * *